Patented June 13, 1939

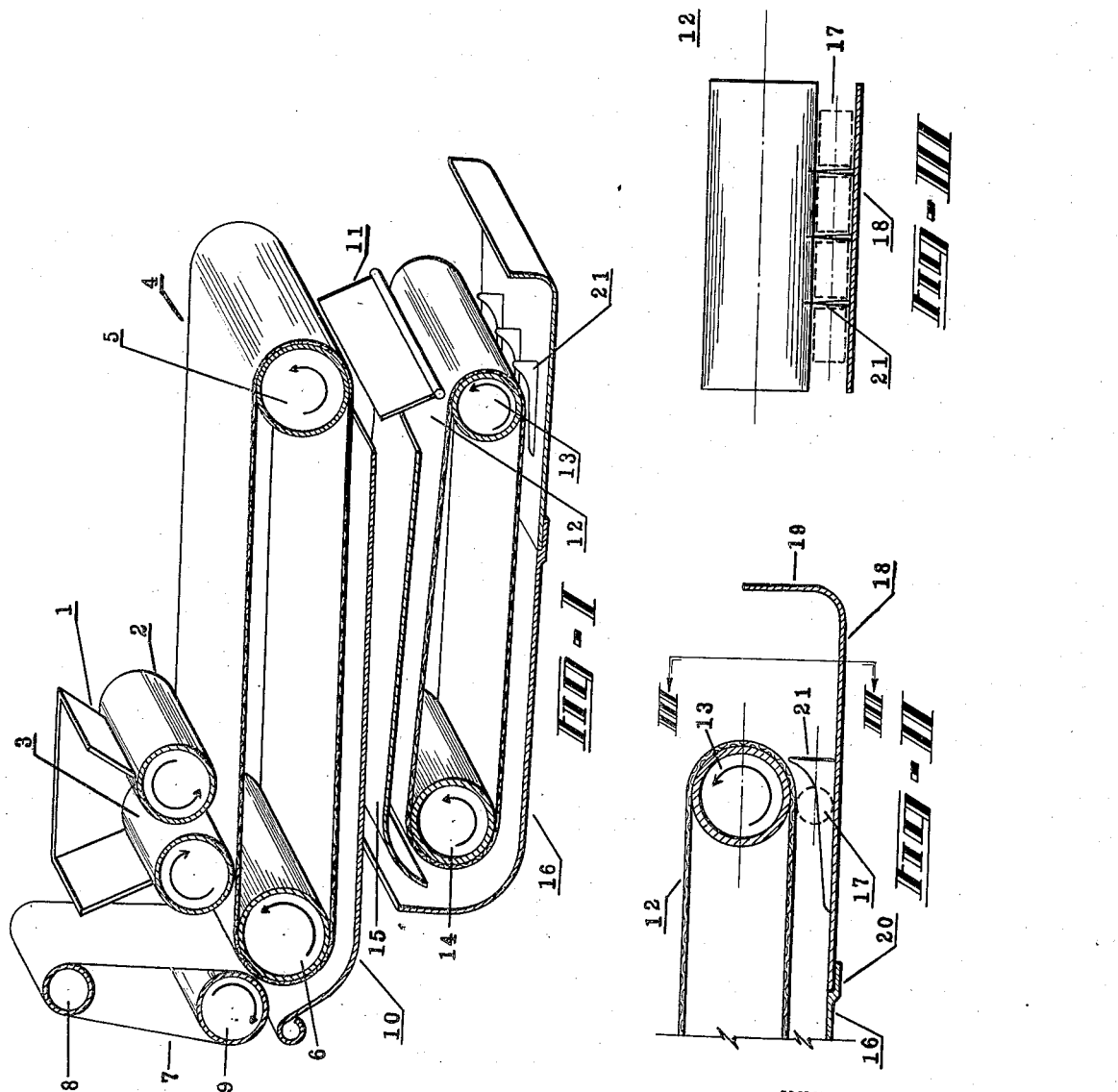

2,162,079

UNITED STATES PATENT OFFICE 2,162,079

MOLDING MACHINE

Herman Grabowski and Gustav Grabowski, Cedar Grove, Wis.

Application May 14, 1938, Serial No. 207,876

2 Claims. (Cl. 107—9)

Our invention relates to improvements in dough molding machines of a type used in bakeries for the molding or forming of dough into loaf shape preparatory to baking.

In the practice of the baking art porosity and lightness is imparted to the loaf by the formation of gas pockets by gas released as a result of the bacterial action of yeast. While the formation of these gas pockets is necessary and desirable, it is also necessary and desirable that they be restricted in size since large gas pockets are objectionable due to the fact that they result in holes in the finished loaf. A bread of superior texture and flavor is obtained when these gas pockets are extremely small in size, numerous and evenly spaced throughout the loaf.

It is the object of the present invention to obviate the tendency, particularly evident when certain flours are used, toward the formation of large gas pockets.

This may be accomplished by cutting the dough loaf transversely of the longitudinal axis thereof into a plurality of sections, for example, four and placing these sections in the baking pan in such position that the portions of the original loaf are parallel to each other, in other words, transverse to the position they would normally occupy were the whole loaf placed in the pan as a unit. This procedure not only eliminates the formation of objectionably large gas pockets but results in a bread of finer, evener texture and better flavor.

The operation of cutting the dough loaf may, of course, be performed manually but this is a tedious and expensive procedure and the cutting is best performed by means of an attachment to the molding or loaf-forming machine.

Suitable mechanism for such purpose is illustrated in the accompanying drawing, in which—

Figure 1 is a longitudinal section, in perspective, of a moulding machine embodying the invention; Figure 2, a longitudinal section of a portion thereof showing the positioning of the cutting knives and Figure 3, a sectional view taken along the lines 3—3 of Figure 2.

The molding machine comprises a hopper 1, positioned above a pair of feeding rollers 2 and 3, adapted to discharge upon a molding belt 4 which is driven by roller pulleys 5 and 6.

Suitably sized pieces of dough are fed into the hopper 1 and pass through the feed rolls 2 and 3 onto the belt 4 and are carried by the belt until they contact the guide belt 7, driven by pulley 8 and passing over roller 9 which is swingably mounted, allowing the belt 7 to swing outward upon contact of the dough therewith and allow the mass of dough to fall downward onto the stationary tray 10 which, as illustrated, is spaced from the belt 4.

The dough mass is rolled, by the action of the belt 4, between the belt 4 and the tray 10, causing it to assume the cylindrical shape of a loaf.

A stop 11 is spaced from the end of the tray 10 and guides the loaf downward and onto a second molding belt 12 driven by pulleys 13 and 14 and spaced from a stationary upper tray 15 and a stationary lower tray 16 so as to roll the loaf 17 between said belt and said trays and further form it into a cylindrical shape as illustrated in Figures 2 and 3.

It will be understood that a suitable frame or base and suitable driving mechanism are provided, the same not being illustrated since they form no part of the present invention.

A receiving tray 18, provided with an upturned portion 19, adapted to serve as a stop or abutment, is adapted to receive the molded loaf.

Preferably the lower tray 16 is provided with an offset portion 20 adapted to receive the tray 18 so as to form an upper surface in a continuous plane.

The division of the loaf is accomplished by means of knives 21, preferably three in number, attached to the receiving tray 18 and extending upwardly therefrom into the path of travel of the loaf 17.

As will be noted, particularly from Figure 2, these knives extend under the belt 12 and are highest adjacent the discharge end of the belt. It will also be noted that the knives 21 extend above the horizontal plane formed by the lower extremity of the belt 12 thus completely intercepting the loaf 17 which is forced into rotary contact with them by the action of the belt 12, completely severing the loaf.

The severed portions of the loaf are ejected onto the receiving tray 18 whence they may be removed and placed in a baking pan as previously described.

It will thus be seen that the machine operates in a convenient, efficient and economical manner to provide a severed loaf.

It will, of course, be understood that numerous changes may be made in the specific mechanism herein described without departing from the principle of the invention, therefore we do not limit ourselves to said specific details or otherwise except by the scope of the appended claims.

We claim:

1. A dough molding machine of the type wherein a cylindrical loaf is formed by rolling a piece of dough over a stationary tray by means of a moving belt and comprising a moving belt, a stationary tray spaced therefrom, said stationary tray being provided with an offset portion, a receiving tray having a portion adapted to fit within said offset portion whereby to form a continuous plane surface with said stationary tray and a plurality of knives attached to said receiving tray and extending therefrom into the path of travel of said loaf.

2. A dough molding machine of the type wherein a cylindrical loaf is formed by rolling a piece of dough over a stationary tray by means of a moving belt and comprising a moving belt, a stationary tray spaced therefrom, said stationary tray being provided with an offset portion, a receiving tray having a portion adapted to fit within said offset portion whereby to form a continuous plane surface with said stationary tray and a plurality of knives attached to said receiving tray and extending therefrom into the path of travel of said loaf, a portion of said knives extending beyond the horizontal plane formed by said belt.

HERMAN GRABOWSKI.
GUSTAV GRABOWSKI.